United States Patent
Sokolov et al.

(10) Patent No.: US 6,742,109 B2
(45) Date of Patent: May 25, 2004

(54) METHOD AND APPARATUS FOR REPRESENTING VARIABLE-SIZE COMPUTER INSTRUCTIONS

(75) Inventors: Stepan Sokolov, Fremont, CA (US); David Wallman, Sunnyvale, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 630 days.

(21) Appl. No.: 09/728,737

(22) Filed: Nov. 30, 2000

(65) Prior Publication Data

US 2002/0095564 A1 Jul. 18, 2002

(51) Int. Cl.[7] .............................. G06F 9/30; G06F 9/44; G06F 9/45
(52) U.S. Cl. ....................... 712/210; 712/212; 712/213; 717/116; 717/118; 717/141; 717/148
(58) Field of Search ............................... 712/213, 219, 712/210, 212, 4, 35; 717/141, 118, 116, 108, 138, 139, 140, 143, 145, 142, 148

(56) References Cited

U.S. PATENT DOCUMENTS

| | | | | |
|---|---|---|---|---|
| 4,633,389 A | * | 12/1986 | Tanaka et al. | 712/4 |
| 5,590,294 A | * | 12/1996 | Mirapuri et al. | 712/219 |
| 5,668,985 A | * | 9/1997 | Carbine et al. | 712/213 |
| 5,758,114 A | | 5/1998 | Johnson et al. | 395/380 |
| 5,898,851 A | | 4/1999 | Narayan et al. | 395/386 |
| 6,065,108 A | | 5/2000 | Tremblay et al. | 712/201 |

FOREIGN PATENT DOCUMENTS

EP    0 969 357 A2    5/2000

OTHER PUBLICATIONS

Publication entitled "Improving CISC Instruction Decoding Performance Using a Fill Unit," by Mark Smotherman and Manoj Franklin, Proceedings of MICRO–28, 1995 IEEE, pp. 219–229.

* cited by examiner

*Primary Examiner*—Daniel H. Pan
(74) *Attorney, Agent, or Firm*—Park, Vaughan & Fleming LLP; Edward J. Grundler

(57) ABSTRACT

One embodiment of the present invention provides a system for executing variable-size computer instructions, wherein a variable-size computer instruction includes an action component that specifies an operation to be performed and a data component of variable size that specifies data associated with the operation. The system operates by first retrieving the variable-size computer instruction from a computing device's memory. The system then decodes the variable-size computer instruction by separating the variable-size computer instruction into the action component and the data component. Next, the system stores the action component in a first store and the data component in a second store so they can be reused without repeated decoding. Finally, the system provides a first flow path for the action component and a second flow path for the data component.

21 Claims, 4 Drawing Sheets

METHOD AND APPARATUS FOR REPRESENTING VARIABLE-SIZE COMPUTER INSTRUCTIONS

BACKGROUND

1. Field of the Invention

The present invention relates to computer instructions. More specifically, the present invention relates to a method and apparatus for representing and executing variable-size computer instructions.

2. Related Art

Modem computing devices execute a series of "executable" instructions from an instruction set to perform operations specified in a computer program. At times these instruction sets are specified in the native language of a central processing unit (CPU). At other times these operations are specified in a platform-independent code that is executed by a platform-independent virtual machine (VM). For example, INTEL™ x86 architecture instructions and SUN SPARC instructions are instruction sets in the native language of a CPU, and JAVA™ bytecodes are a platform-independent code for a platform-independent VM.

The terms JAVA, JVM and JAVA VIRTUAL MACHINE are registered trademarks of SUN Microsystems, Inc. of Palo Alto, Calif. Intel is a registered trademark of the Intel Corporation of Santa Clara, Calif.

Executable instructions have two portions. A first portion specifies an action to be performed and a second portion provides a source for data that may be required for the instruction. Note that some instructions, such as a no-operation instruction, do not require data, while other instructions require data. This data can be provided in the form of immediate data values, or alternatively, in the form of pointers to the data values.

The x86 instruction "add eax, ebx" exemplifies an instruction which has both action and data portions. The action in this case is addition, while the data portion indicates that the value in register ebx is to be added to the value in register eax with the result remaining in register eax. Since the data size varies from instruction to instruction in these instruction sets, the size of the entire instruction varies as well.

Variable-size instructions have many drawbacks. Each instruction has to be decoded to determine its size, and therefore, the location of the next instruction. Also, some computing devices require multiple fetch cycles to retrieve variable-size instructions since not all instructions are stored at convenient locations for fetching in a single fetch cycle. Since a given variable-size instruction may not start on a word boundary, the given instruction may require fetches of multiple words that contain the instruction and then subsequent reassembly of the given instruction from the parts located within the multiple words.

The biggest drawback is that the CPU does not know how many bytes/words to fetch until it decodes at least the first byte of an instruction. If an instruction is positioned in memory in such a way that it is split between two cache lines, the CPU does not know that it has to fetch the next line until it decodes the first byte of the instruction. The time penalty can be significant. To avoid this penalty, compilers try to generate code without splitting instructions by inserting padding bytes or reordering instructions.

Thus, using variable-size instructions can result in computer programs that run more slowly because of the additional processing and the additional fetch cycles included in processing variable-size instructions.

What is needed is a method and apparatus which alleviates the above-described problems in using variable-size instructions.

SUMMARY

One embodiment of the present invention provides a system for executing variable-size computer instructions, wherein a variable-size computer instruction includes an action component that specifies an operation to be performed and a data component of variable size that specifies data associated with the operation. The system operates by first retrieving the variable-size computer instruction from a computing device's memory. The system then decodes the variable-size computer instruction by separating the variable-size computer instruction into the "action" component and the "data" component. Next, the system stores the action component in a first store and the data component in a second store so they can be reused without repeated decoding. Finally, the system provides a first flow path for the action component and a second flow path for the data component.

In one embodiment of the present invention, the data component of the variable-size computer instruction has a length of zero or greater.

In one embodiment of the present invention, the first flow path and the second flow path are synchronized so that the action component and data component are retrieved together.

In one embodiment of the present invention, the system executes the action component from the first store and receives the data component associated with the action component from the second store.

In one embodiment of the present invention, if the action component is a branch instruction to a previously decoded variable-size computer instruction, the system uses the action component from the first store and the data component from the second store for the previously decoded variable-size computer instruction.

In one embodiment of the present invention, a given entry in the first store contains a pointer to the data component in the second store associated with the action component stored in the first store.

In one embodiment of the present invention, the action component stored in the first store has a fixed size, so that the action component can be accessed with a single fetch operation.

Table 1 is a representation of how instructions are entered into memory in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Devices

Figure 1:
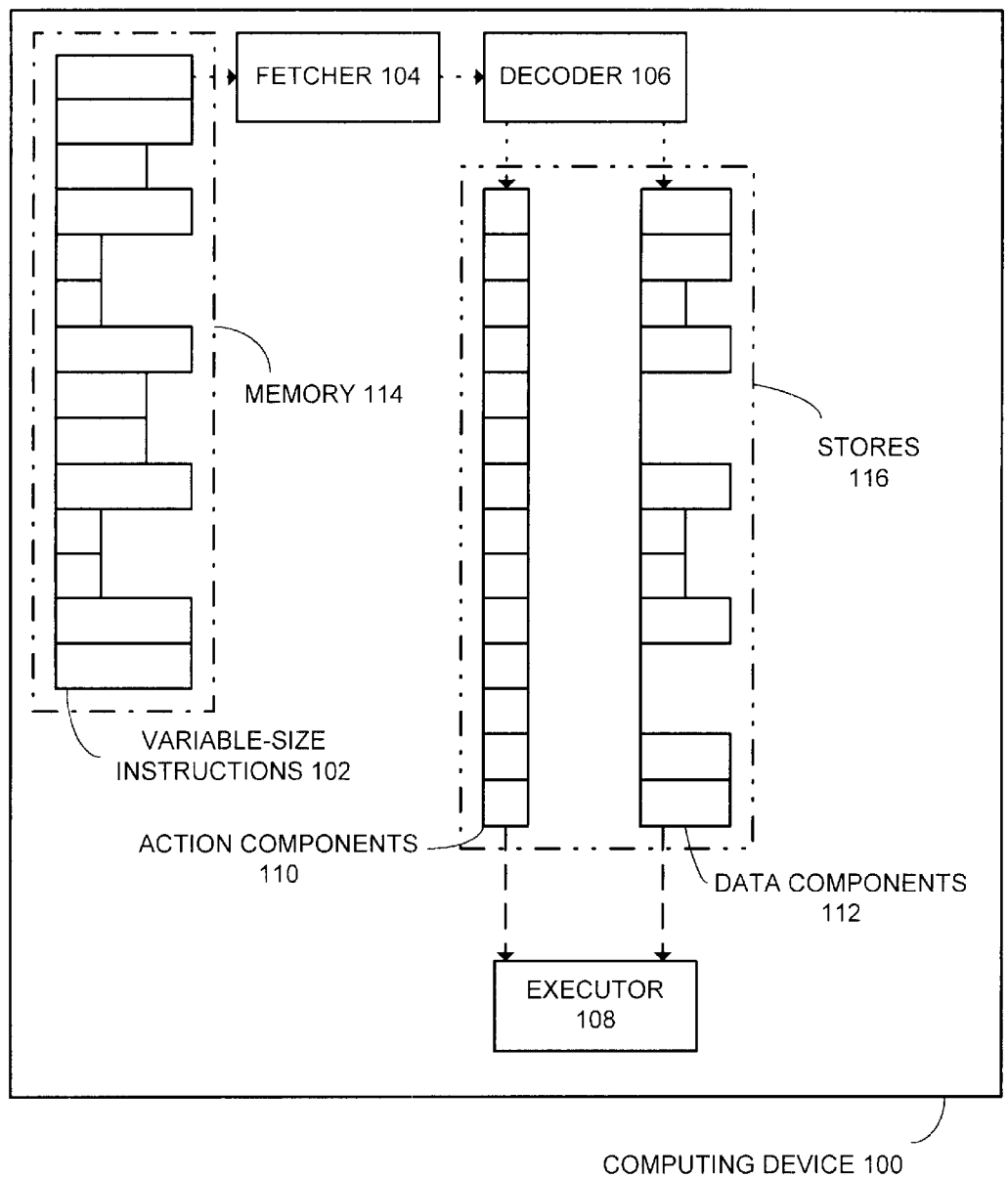
FIG. 1 illustrates computing device 100, which is configured to decode variable-size computer instructions into an action component and a data component in accordance with an embodiment of the present invention.

FIG. 1 illustrates computing device 100, which is configured to decode variable-size computer instructions into an action component and a data component in accordance with an embodiment of the present invention. Computing device 100 may include any type of computer system, including, but not limited to, a computer system based on a microprocessor, a mainframe computer, a digital signal processor, a personal organizer, a device controller, and a computational engine within an appliance.

Computing device 100 includes memory 114 wherein variable-size instructions 102 are located. Memory 114 can include any type of storage that can be coupled to a computer system. This includes, but is not limited to, semiconductor random access memory, read-only memory, magnetic, optical, and magneto-optical storage devices, as well as storage devices based on flash memory and/or battery-backed up memory.

It should be noted that variable-size instructions 102 are positioned sequentially in memory as indicated in Table 1 below. Each instruction is in memory immediately following the previous instruction. To be able to find, for instance, the start of instruction inst4, instructions inst1, inst2, and inst3 need to be decoded.

TABLE 1

| inst1 | inst2 --- | inst3------- | inst4---------- | inst5---- |

Also included in computing device 100 are fetcher 104, decoder 106, executor 108, and stores 116. During operation, fetcher 104 accesses the next variable-size computer instruction from variable-size instructions 102, and passes this variable-size computer instruction to decoder 106. Decoder 106 then decodes the instruction and separates the action component and data component from the variable-size instruction.

Decoder 106 then stores the action component of the variable-size instruction in action components 110 and the data component in data components 112. The action components stored within action components 110 are fixed in size to allow easy access with a single fetch cycle. Action components 110 and data components 112 are contained within stores 116. Stores 116 can be implemented as part of memory 114, as would be appropriate for instructions such as JAVA bytecodes being executed by an interpreter. Stores 116 can alternatively be implemented as dedicated hardware storage within a central processing unit. Dedicated hardware storage would be appropriate for native processor instructions, such as x86 architecture instructions, since it is normal for such instructions to be stored in an internal cache.

Executor 108 processes the instructions stored within stores 116 by first retrieving the action component from action components 110. If there is a data component associated with the action component, executor 108 retrieves the data component from data components 112. Next, executor 108 performs the action specified by the action component. Finally, executor 108 determines which instruction is to be accessed next by determining if the current instruction is a branch instruction that alters the normal sequential order of accessing instructions. If the current instruction is a branch instruction, executor 108 adjusts instruction pointer 202 to point to a previously executed instruction within stores 116. If the current instruction is not a branch instruction, executor 108 adjusts instruction pointer 202 to point to the next instruction within stores 116.

Code Execution

Figure 2:
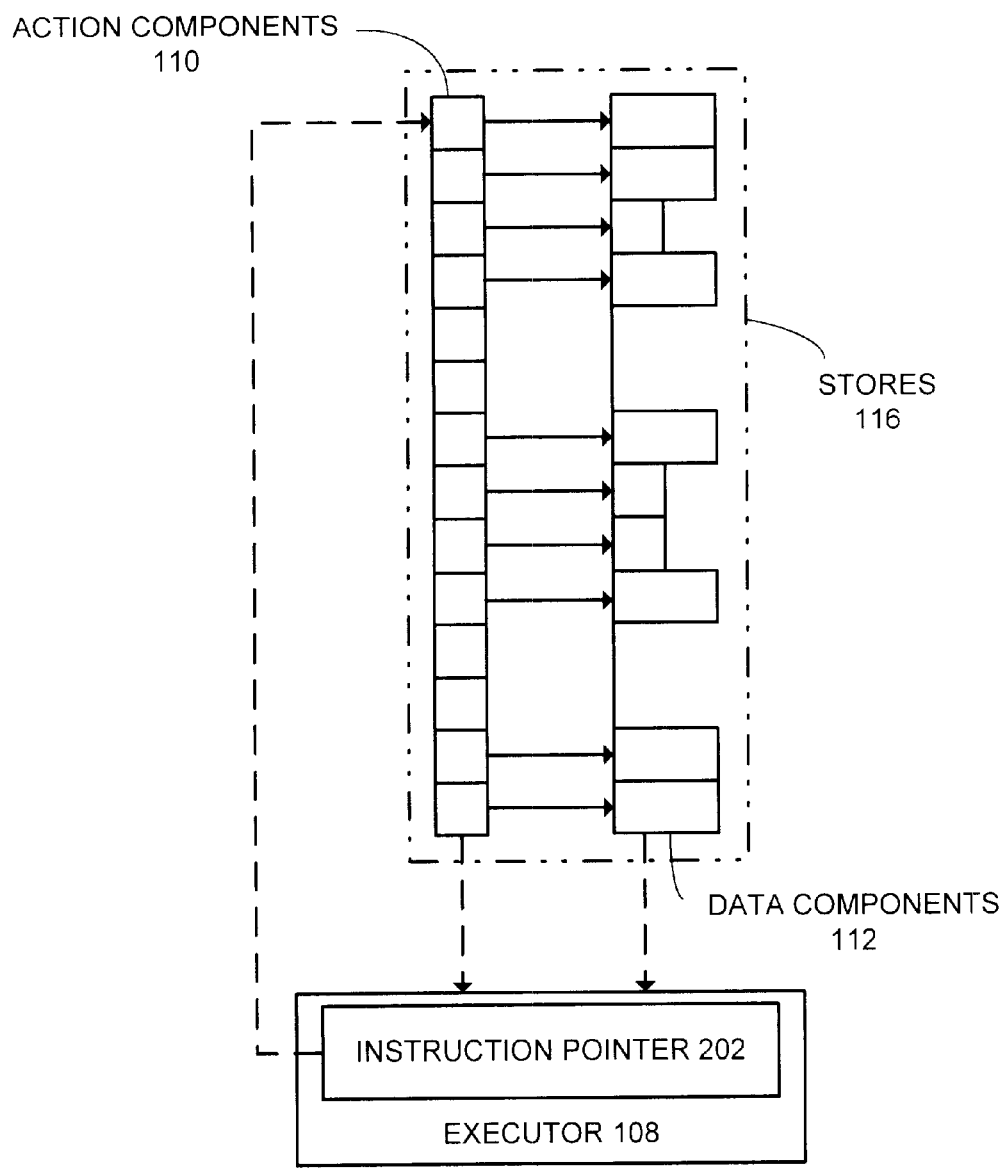
FIG. 2 illustrates executor 108, which is configured to execute instructions from stores 116 in accordance with an embodiment of the present invention.

FIG. 2 illustrates executor 108, which is configured to execute instructions from stores 116 in accordance with an embodiment of the present invention. Executor 108 includes instruction pointer 202. Instruction pointer 202 points to the next action component to be executed within action components 110. Executor 108 accesses the action component to be executed from within action components 110 and determines if there is a data component within data components 112 that is associated with the action component. If there as a data component associated with the action component, executor 108 accesses the data component and completes the action. If the action component is a branch instruction, executor 108 adjusts instruction pointer 202 to access the action component that is the target of the branch instruction. Otherwise, executor 108 increments instruction pointer 202 so that instruction pointer 202 points to the next action component.

Fetching and Decoding Instructions

Figure 3:
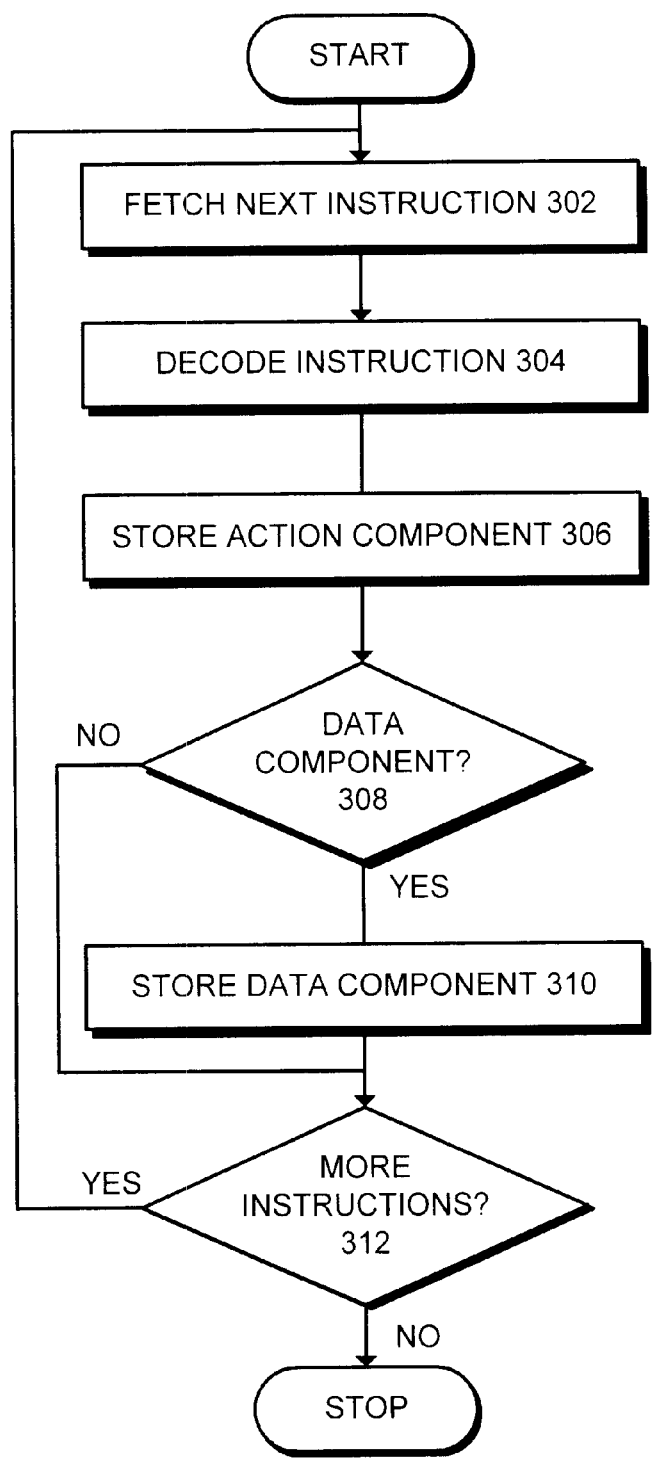
FIG. 3 is a flowchart illustrating the process of fetching and decoding variable-size computer instructions in accordance with an embodiment of the present invention.

FIG. 3 is a flowchart illustrating the process of fetching and decoding variable-size computer instructions in accordance with an embodiment of the present invention. The system starts when fetcher 104 fetches the next variable-size computer instruction from variable-size instructions 102 (step 302). Next, decoder 106 decodes the variable-size instruction and separates the variable-size instruction into an action component and an optional data component (step 304).

Decoder 106 then stores the action component of the variable-size instruction in action components 110 of stores 116 (step 306). Decoder 106 next determines if there is a data component associated with the action component of the variable-size instruction (step 308). If there is a data component, decoder 106 stores the data component in data components 112 of stores 116 (step 310).

After storing the data component at step 310 or if there is no data component at step 308, the system determines if there are more instructions in variable-size instructions 102 (step 312). If there are more instructions at step 312, the system returns to step 302 to continue processing variable-size instructions. If there are no more instructions in variable-size instructions 102 at step 312, processing is terminated.

Executing Decoded Instructions

Figure 4:
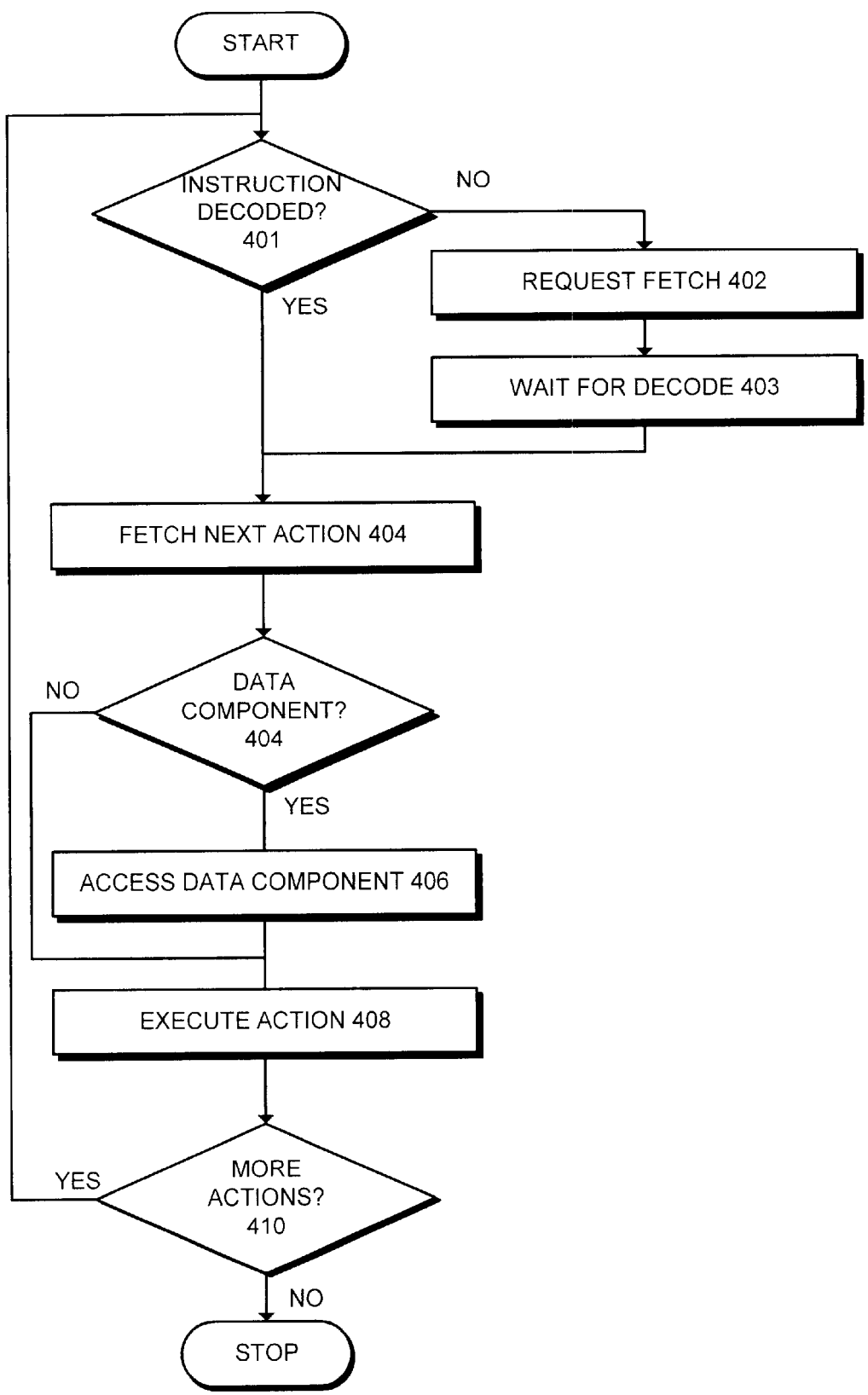
FIG. 4 is a flowchart illustrating the process of executing previously decoded instructions in accordance with an embodiment of the present invention.

FIG. 4 is a flowchart illustrating the process of executing previously decoded instructions in accordance with an embodiment of the present invention. Note that instructions being executed must have been previously decoded. The system starts when executor 108 determines if the next instruction has been decoded and is available in stores 116 (step 401). If the next instruction has not been decoded at step 401, executor 108 requests the next instruction from fetcher 104 (step 402). Executor 108 then waits for the instruction to be decoded (step 403).

After the next instruction has been decoded at step 403 or if the next instruction was previously decoded at step 401, executor 108 fetches the next action from action components 110 (step 404). Next, executor 108 determines if there is a data component associated with the action component fetched in step 402 (step 404).

If there is a data component associated with the action component, executor 108 retrieves the data component (step 406). After retrieving the data component at step 406, or if there is no data component at step 404, executor 108 executes the action (step 408). Note that executing the action may include causing executor 108 to point to a previously executed action component within action components 110 so that a loop of actions can be repeated.

After executing the action at step 408, executor 108 determines if there are any more actions to be taken (step 410). If there are more actions to be taken at step 410, executor 108 returns to step 402 to fetch the next action, otherwise, execution is terminated.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for executing variable-size computer instructions, wherein a variable-size computer instruction includes an action component that specifies an operation to be performed and a data component of variable size that specifies data associated with the operation, wherein variable-size refers to a length of the data component in bytes, comprising;
   retrieving the variable-size computer instruction from a computing device's memory;
   decoding the variable-size computer instruction;
   separating the variable-size computer instruction into the action component and the data component;
   storing the action component in a first store;
   storing the data component in a second store, whereby the action component and data component can be reused without repeated decoding;
   providing a first flow path for the action component; and
   providing a second flow path for the data component.

2. The method of claim 1, wherein the data component has a length of zero or greater.

3. The method of claim 2, wherein the first flow path and the second flow path are synchronized so that the action component and data component are retrieved together.

4. The method of claim 3, further comprising;
   executing the action component from the first store; and
   retrieving the data component associated with the action component from the second store.

5. The method of claim 4, wherein if the action component is a branch instruction to a previously decoded variable-size computer instruction, the method further comprises using the action component from the first store and the data component from the second store for the previously decoded variable-size computer instruction.

6. The method of claim 3, wherein the first store contains a pointer to the data component in the second store associated with the action component stored in the first store.

7. The method of claim 3, wherein the action component stored in the first store has a fixed size whereby the action component can be accessed with a single fetch operation.

8. A computer-readable storage medium storing instructions that when executed by a computer causes the computer to perform a method for executing variable-size computer instructions, wherein a variable-size computer instruction includes an action component that specifies an operation to be performed and a data component of variable size that specifies data associated with the operation, wherein variable-size refers to a length of the data component in bytes, comprising;
   retrieving the variable-size computer instruction from a computing device's memory;
   decoding the variable-size computer instruction;
   separating the variable-size computer instruction into the action component and the data component;
   storing the action component in a first store;
   storing the data component in a second store, whereby the action component and data component can be reused without repeated decoding;
   providing a first flow path for the action component; and
   providing a second flow path for the data component.

9. The computer-readable storage medium of claim 8, wherein the data component has a length of zero or greater.

10. The computer-readable storage medium of claim 9, wherein the first flow path and the second flow path are synchronized so that the action component and data component are retrieved together.

11. The computer-readable storage medium of claim 10, wherein the method further comprises;
    executing the action component from the first store; and
    receiving the data component associated with the action component from the second store.

12. The computer-readable storage medium of claim 11, wherein if the action component is a branch instruction to a previously decoded variable-size computer instruction, the method further comprises using the action component from the first store and the data component from the second store for the previously decoded variable-size computer instruction.

13. The computer-readable storage medium of claim 10, wherein the first store contains a pointer to the data component in the second store associated with the action component stored in the first store.

14. The computer-readable storage medium of claim 10, wherein the action component stored in the first store is a fixed size whereby the action component can be accessed with a single fetch operation.

15. An apparatus that facilitates using variable-size computer instructions, wherein a variable-size computer instruction includes an action component that specifies an operation to be performed and a data component of variable size that specifies data associated with the operation, wherein variable-size refers to a length of the data component in bytes, comprising;
    a retrieving mechanism that is configured to retrieve the variable-size computer instruction from a computing device's memory;

a decoding mechanism that is configured to decode the variable-size computer instruction;

a separating mechanism that is configured to separate the variable-size computer instruction into the action component and the data component;

a storing mechanism that is configured to store the action component in a first store and the data component in a second store so they can be reused without repeated decoding;

an execution unit that is configured to execute instructions;

a first flow path for channeling the action component into the execution unit; and a second flow path for channeling the data component into the execution unit.

16. The apparatus of claim 15, wherein the data component has a length of zero or greater.

17. The apparatus of claim 16, wherein the first flow path and the second flow path are synchronized so that the action component and data component are retrieved together.

18. The apparatus of claim 17, further comprising;

an executing mechanism that is configured to execute the action component from the first store; and a receiving mechanism that is configured to receive the data component associated with the action component from the second store.

19. The apparatus of claim 18, wherein if the action component is a branch instruction to a previously decoded variable-size computer instruction, the apparatus is further configured to use the action component from the first store and the data component from the second store for the previously decoded variable-size computer instruction.

20. The apparatus of claim 17, wherein the first store contains a pointer to the data component in the second store associated with the action component stored in the first store.

21. The apparatus of claim 17, wherein the action component stored in the first store is a fixed size whereby the action component can be accessed with a single fetch operation.

* * * * *